(12) United States Patent
Kryukov

(10) Patent No.: US 8,407,196 B1
(45) Date of Patent: Mar. 26, 2013

(54) OBJECT-ORIENTED DATABASE FOR FILE SYSTEM EMULATOR

(75) Inventor: Andrey V. Kryukov, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 447 days.

(21) Appl. No.: 12/395,654

(22) Filed: Feb. 28, 2009

(51) Int. Cl.
*G06F 7/00* (2006.01)
*G06F 17/30* (2006.01)

(52) U.S. Cl. ........................... 707/705; 707/758
(58) Field of Classification Search .................. None
See application file for complete search history.

(56) References Cited

U.S. PATENT DOCUMENTS

| | | | |
|---|---|---|---|
| 6,094,649 A * | 7/2000 | Bowen et al. | 707/711 |
| 7,603,713 B1 * | 10/2009 | Belov | 726/24 |
| 7,739,100 B1 * | 6/2010 | Muttik et al. | 703/26 |
| 2003/0105758 A1 * | 6/2003 | Kliewe | 707/9 |
| 2005/0187944 A1 * | 8/2005 | Acheson et al. | 707/100 |
| 2006/0041574 A1 * | 2/2006 | Cunningham et al. | 707/101 |
| 2007/0156793 A1 * | 7/2007 | D'Souza et al. | 707/204 |
| 2009/0077544 A1 * | 3/2009 | Wu | 717/160 |
| 2009/0126016 A1 * | 5/2009 | Sobko et al. | 726/23 |

* cited by examiner

*Primary Examiner* — Cheryl Lewis
*Assistant Examiner* — Raheem Hoffler
(74) *Attorney, Agent, or Firm* — Bardmesser Law Group

(57) ABSTRACT

A system and computer program product for implementing an object-oriented hierarchical database architecture that supports functionality of an emulator. The hierarchical data architecture is created for implementing a files system and/or a system registry inside the emulator, where malware components are emulated and tested. The data architecture supports the emulator and provides for effective recovery of a database fragments after modifications of the fragments by the emulated malware. The non-relational object-oriented database consists of database objects. Each of the database objects has various data fields. Special user types are assigned to the database objects. Each user type is defined by a selected set of data fields. The database objects have a parent-child relationship. Each database object has a unique parent object and a unique set of index fields. The unique set of the index fields is a unique set of data fields of an object. The database has a root object which is unique for the database.

17 Claims, 14 Drawing Sheets

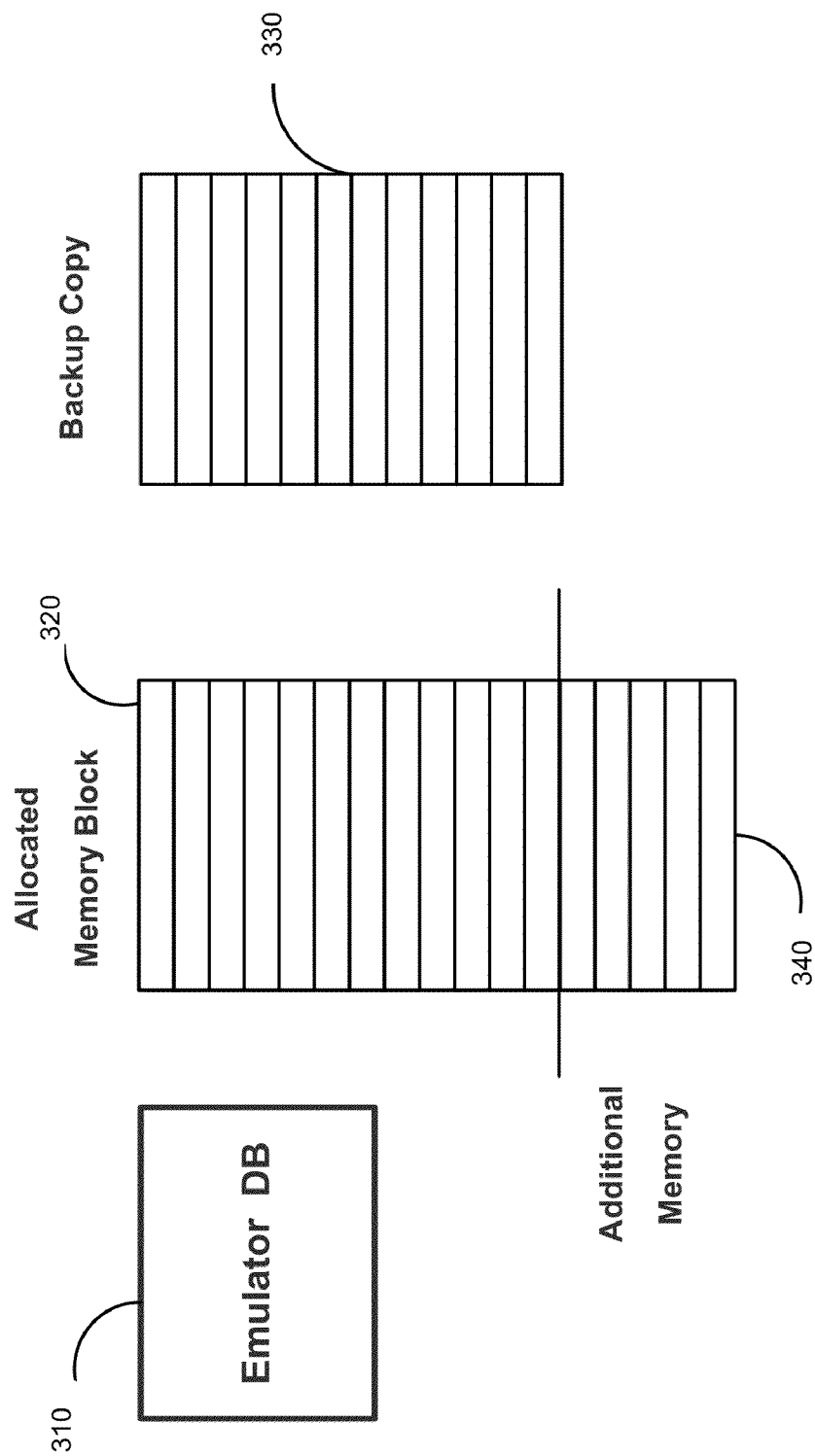

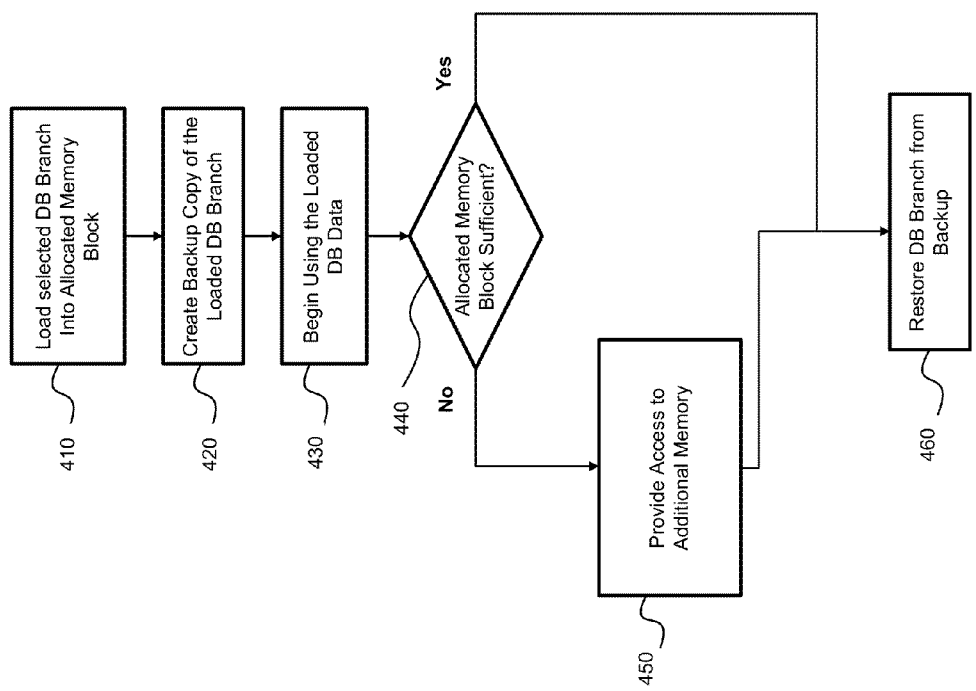

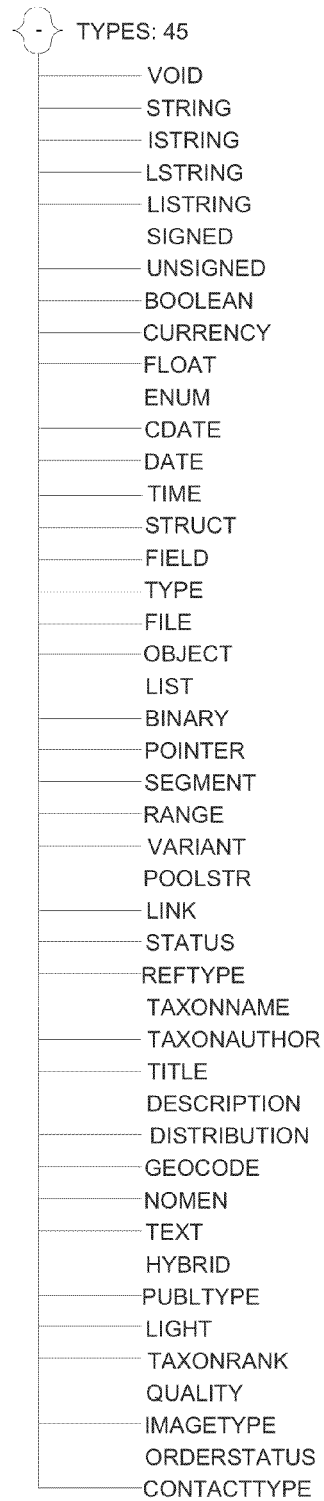
FIG. 8
Root object: ROOT

{+} TYPES: 45

{+} FIELDS: 138

{-} STRUCTURES: 51
- POINTER
- ROOT
- TAXONLIST
- *FOUND
- CROSS
- PUBLICATION
- DESCRIPTION
- SEECOMMENT
- REFERENCE
- ALTSEE
- PROBABLY
- PARENT
- SYNONYM
- TAXON
- KINGDOM
- DIVISION
- SUBDIVISION
- CLASS
- SUBCLASS
- ORDER
- SUBORDER
- FAMILY
- SUBFAMILY
- TRIBE
- SUBTRIBE
- GENUS
- SUBGENUS
- SECTION
- SUBSECTION
- SERIES
- SUBSERIES
- SPECIE
- SUBSPECIE
- VAR
- SUBVAR
- FORM
- SUBFORM
- LUS
- MISSED
- TAXONREF
- ERROR
- ABBR
- IMAGE
- IMGIDX
- PRICELIST
- PRICELINE
- WISH
- OPTION

FIG. 9

NAME: epipactis
AUTHOR: Zinn
STATUS: ACCEPTED
NOMEN: nom. cons
SUBTAXON: 82 objects PUBLICATION: Cat. Pl. Hort. Gott. (85): (1757)
Description from Kew checklist of family Orchidaceae
SYNONYM: SYN Amesia A. Nelson & J. F. Macbr
SYNONYM: SYN Arthrochilium Beck
SYNONYM: SYN Calliphyllon Budani
SYNONYM: SYN Limonias Ehrh.
SYNONYM: SYN Limodorum Ludw. ex Kuntze
SYNONYM: SYN Prapactis W. Zimm.
SYNONYM: SYN Helleborine Mill.
ACC Epipactis africana Rendle
ACC Epipactis albensis Novckovc & Rydlo
ACC Epipactis x amigoi J. M. Lewin
ACC Epipactis atromarginata Seidenf.
ACC Epipactis atrorubens (Hoffm.) Besser
ACC Epipactis x barlae A. Camus
ACC Epipactis x barreana B. Baumann & H. Baumann
ACC Epipactis baumanniorum Struhle
...

FIG. 12

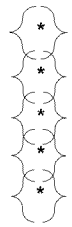
NAME: acianthopsis
AUTHOR: Szlach
AUTHOR_OLD:
YEAR: 0
NUMBER: 0
STATUS: SYNONYM
HYBRID: NONE
BASIONYM: False
SEE: ACC Acianthus R. Br.
NOMEN:
 SUBTAXON: 16 objects PUBLICATION: Polish Bot. J. 46(143): (2001)
  Description from Kew checklist of family Orchidaceae
  SYN Acianthopsis aegeridantennata (N. Halls) Szlach.
  SYN Acianthopsis amplexicaulis (F. M. Bailey) Szlach.
  SYN Acianthopsis bracteata (Rendle) Szlach.
  SYN Acianthopsis confusa (Guillaumin) Szlach.
  SYN Acianthopsis corniculata (Rendle) Szlach.
  SYN Acianthopsis cymbalariifolia (F. Muell & Kraenzl.) Szlach.
  SYN Acianthopsis elegans (Rchb.f.) Szlach.
  SYN Acianthopsis grandiflora (Schltr.) Szlach.
  SYN Acianthopsis halleana (Kores) Szlach.
  SYN Acianthopsis haptadactyla (Kraenzl.) Szlach.
  SYN Acianthopsis macroglossa (Schltr.) Szlach.
  SYN Acianthopsis oxyglossa (Schltr.) Szlach.
  SYN Acianthopsis sublesta (Dockrill) Szlach.
  SYN Acianthopsis tenuilabris (Schltr.) Szlach.
  SYN Acianthopsis veillonis (N. Halls) Szlach.

FIG. 13

OBJECT-ORIENTED DATABASE FOR FILE SYSTEM EMULATOR

BACKGROUND OF THE INVENTION

1. Field of the Invention

The present invention is related to data backup and recovery technology and more particularly, to a non-relational database for emulation of a file system.

2. Description of the Related Art

Over the past decade files systems and system registries have become larger and significantly more complex. An ability to emulate a file system and a system registry is critical in terms of security and data recovery. Emulation is often used for anti-virus and intrusion detection procedures. In order to analyze behavior of malware and viruses and collect statistics, a file system is emulated and the viruses are run on the emulated files system. Modern viruses often infect hundreds and even thousands of files of a computer file system simultaneously. Thus, large volumes of data need to be emulated and processed.

However, existing emulators do not provide extensibility and scalability needed for emulating the scenarios presented by the modern malware applications that simultaneously access and modify a large number of files. The existing emulators are very slow when emulating these types of environments. They lack in processing speed as they depend on conventional database systems not capable of supporting full scale file system emulation.

Another problem in using the emulators for malware analysis is that each malware component modifies the file system and a new (i.e., clean) file system needs to be loaded into the emulator for analyzing another malware component and collecting statistics needed. Therefore, a method for a rapid recovery of the file system is needed in order to repeatedly emulate the file system for testing and analyzing it with another malware component.

The existing database systems do not allow for rapid data recovery after multiple modifications of a database fragment. Conventional relational databases are quite slow and cannot easily process very large volumes of data as the ones required by an emulator. Non-relational databases are faster and can provide better data recovery, but they are very difficult to implement. Additionally both types of existing databases are not sufficient for robust and efficient emulation of a file system and for recovery of a database fragment used by the emulator.

Accordingly, there is a need in the art for a non-relational database architecture that can meet the requirements of modern emulators and is easy to implement.

SUMMARY OF THE INVENTION

The present invention implements a database system for emulation of a file system that substantially obviates one or several of the disadvantages of the related art.

In one aspect of the invention there is provided a database architecture that supports functionality of an emulator. In another aspect of the invention there is provided a method for adding new types of objects to a database. According to the exemplary embodiment, a hierarchical data architecture is created for implementing a files system and/or a system registry inside an emulator.

The proposed data architecture supports the emulator and provides for effective recovery of a database fragments after multiple modifications of the fragments by an emulated malware component. In one embodiment an object-oriented database is provided. Each of the database objects has various data fields. Special user types are assigned to the database objects. Thus, each user type is defined by a selected set of data fields. According to the exemplary embodiment, some user types can have the same set of the data fields and the data fields of different user types can be partly coincident.

The database objects in the proposed architecture have a parent-child relationship. Thus, the types of users having similar or the same set of the data fields are logically separated. Each database object has a unique parent object and a unique set of index fields. The set of the index fields is a unique set of data fields of an object. The exemplary embodiment also has a root object that is unique for the database. The root object is different from any other database objects, because the fields of the root object are the data field sets with the names that are unique and can only be assigned to the root object. The proposed database has a cross-referencing capability.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings:

FIG. 3 illustrates an example of implementing the emulator using the object-oriented database, in accordance with the exemplary embodiment;

FIG. 4 illustrates a block diagram of a method for using the object-oriented database in an emulator, in accordance with the exemplary embodiment;

FIG. 8 illustrates an exemplary structure of a list of all types of object fields;

FIG. 9 illustrates an exemplary structure of user types of the data object;

FIG. 12 illustrates an exemplary structure of an exemplary object;

FIG. 13 illustrates an exemplary structure of an object with object's index fields;

DETAILED DESCRIPTION OF THE PREFERRED EMBODIMENTS

Figure 1:
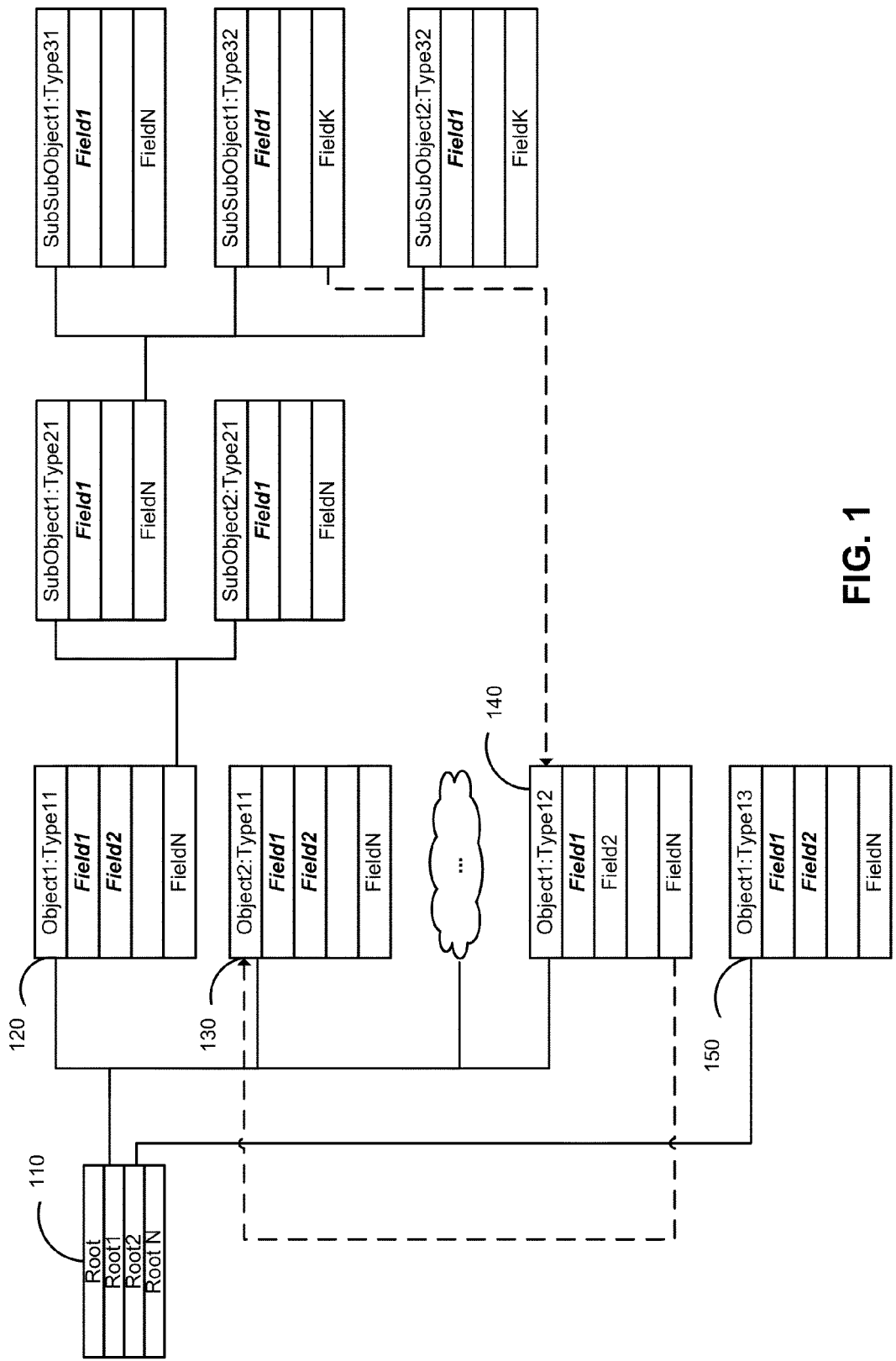
FIG. 1 illustrates an object-oriented database architecture, in accordance with the exemplary embodiment.

Reference will now be made in detail to the preferred embodiments of the present invention, examples of which are illustrated in the accompanying drawings.

The present invention is intended as a non-relational hierarchical database for emulation of a file system (or a system registry) with a malware component executed on it that substantially obviates one or several of the disadvantages of the related art. In one embodiment there is provided a database architecture that supports functionality of a file system emulator. A method for adding new types of objects to an object-oriented non-relational database is also provided. According to the exemplary embodiment, the object-oriented hierarchical database is created for emulating file systems or system registries with malware components executed on them.

The object-oriented database, in accordance with an exemplary embodiment, supports an emulator and provides for effective recovery of a database fragments after multiple modifications of the fragments by a malware component. Each of the database objects has various data fields, such as, for example, a text string, a Boolean expression, a number, a reference, a list, etc. Special user types are assigned to the database objects.

For example, if the database contains the information related to plants, the following user types will be created for all data objects: Taxon (a prototype for all types of the plants), Specie (for defining the plant family), SubSpecie (for defining the sub family or kind of the plant), Book (for defining a book containing information about the plant), Image (for visual representation of the plant), and Synonym (for referencing to other similar plants or analogous species).

Thus, each user type is defined by a selected set of data fields. For example, for the user type Taxon, the following set of data fields will be used: Name, Author, SubTaxon (e.g., child-objects). According to the exemplary embodiment, some user types can have the same set of the data fields and the data fields of different user types can be partly coincident. In the example used herein, the type Species will have the field set coinciding with the fields of the user type Taxon. In other words, the type Species inherits the fields from the parent type Taxon. Likewise, the fields of the user type Sub-Species will also coincide with the data field set of the type Taxon. Thus, the user types having similar or the same set of the data fields are logically separated.

According to the exemplary embodiment, logical separation of the user types is provided by the database hierarchy (i.e., a parent-child relationship among the data objects of the object-oriented database). Note that proposed object-oriented non-relational database can have an arbitrary number of user types.

The database objects can be entirely or partially filled. Each database object is defined by a unique parent-object, its type and a unique set of index fields. The object's set of the index fields is a unique set of data fields of this object. An object can have one or several index fields. Note that while the set of the index fields is unique to an object, an individual index field can be the same for several objects. For example, for the object Taxon the data fields Name and Author can be its index fields. The index fields are very critical to an object as it can only be accessed using the index fields. Thus, in order to access the object Taxon the following parameters are needed: the object's type (Taxon), the object's name (Name), the author (Author).

Note that it is not necessary to have all index fields of an object filled. For example, two different objects can have the same index field, but have other different index fields. According to the exemplary embodiment, the object fields can be any of: index fields, non-index fields, lists, references, etc.

An index field is the field used for uniquely identifying and accessing an object. An object can have several index fields. As discussed above, an object can be accessed based on its index field and its type. All index fields do not have to be filled, but a combination of the filled index fields has to be unique for an object of a particular type, so the objects can be differentiated within the type. For example, two objects of the type Taxon with the same name (Name) can exist, as long as they have different authors (Author).

A non-index field is the data field that can be any of: a string, a number, a Boolean expression. A list is a collection of child-objects of any type ordered by types of objects. A reference is a data field referring to any object within the database regardless of its location. A reference field can refer to child-objects as well as to parent-objects. In other words, object cross-referencing scheme is implemented in the exemplary embodiment. Note that the reference field cannot refer to a root object of the database.

According to the exemplary embodiment, a unique parent-object is required for each object of the database. The exemplary embodiment also has a root object, which is unique for the database. The root object is different from any other database objects. The fields of the root object are the data field sets with the names that are unique and can only be assigned to the root object.

The proposed database has a hierarchical structure supported by parent-child relationships and a cross-referencing capability among its objects. Thus, a complete path to an object within the hierarchy of the database is a list of locations (i.e., objects) within the hierarchy that need to be passed on the way from the root object to the destination object.

FIG. 1 illustrates a non-relational object-oriented database architecture, in accordance with the exemplary embodiment. The database has a required root object 110. The root object 110 has a set of fields (Root 1-Root N) that only reference objects of the next level of the hierarchy. Other objects staring from the first level below root level (i.e., objects 120, 130 and 140) do not have any limitations to their data field sets. All of the field sets of the child-objects are grouped by their types. For example, all child-objects of the root object 110 are organized as follows: first are objects 120 and 130 of the Type 11, then, object 140 of the Type 12 and object 150 of the Type 13. The child-objects 120, 130, 140 and 150 can have an arbitrary number of Sub Objects and Sub Sub Objects, as shown in FIG. 1.

According to the exemplary embodiment, the database can be modified or edited by adding objects of a new type (for example, a malware component can add or delete files). Also, existing database objects can be modified by addition or removal of the fields of a given type. The fields of the given type can also be re-named. The database objects can also be removed. In this case, first, all references to the object are removed. Then, all child-objects with their respective references are removed and only then, the object is removed. Thus, the object-oriented database is highly scalable and flexible.

Figure 2:
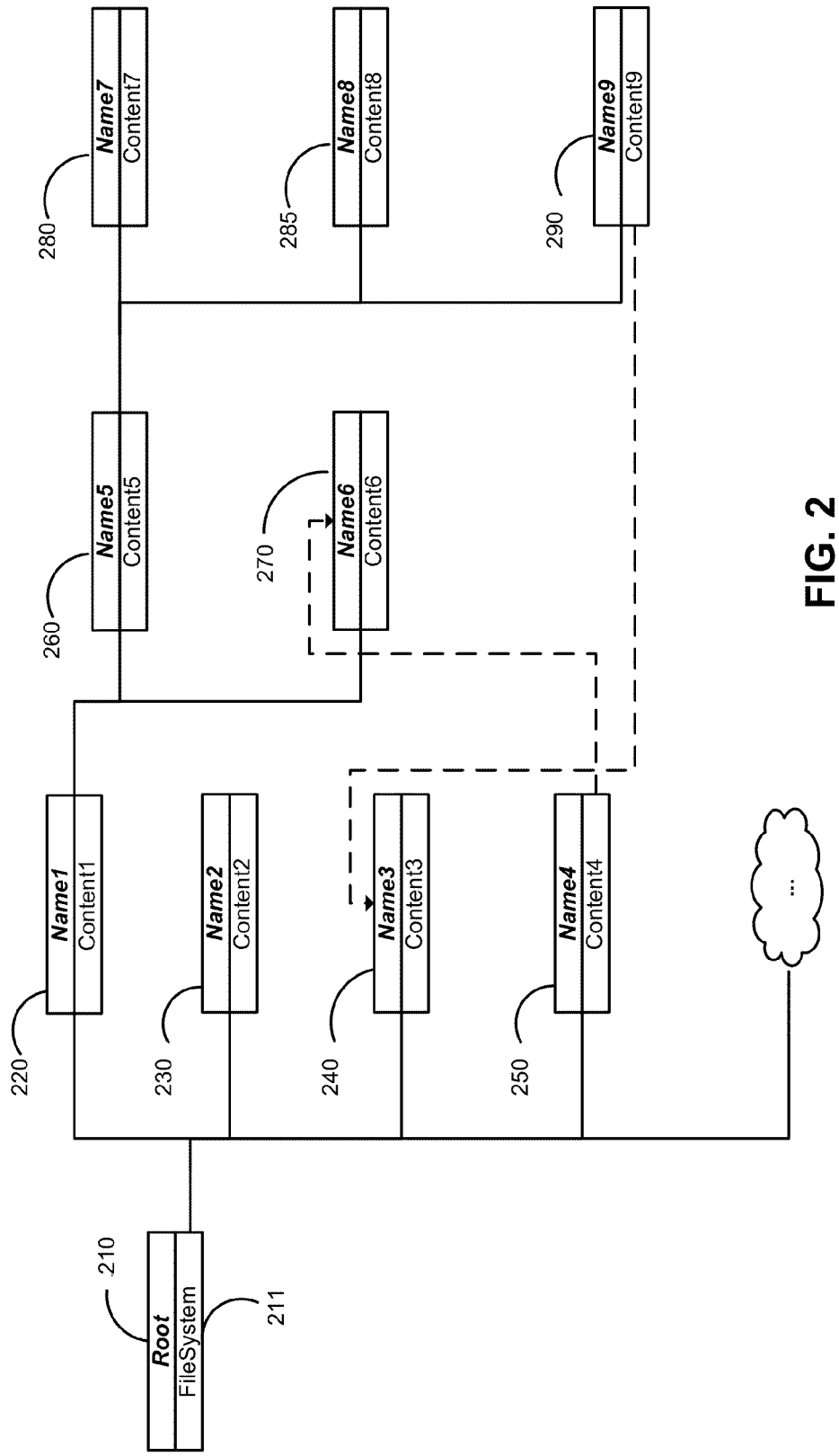
FIG. 2 illustrates an object-oriented database structure used for file system emulation, in accordance with the exemplary embodiment.

FIG. 2 illustrates an object-oriented non-relational database structure described above used for file system emulation, in accordance with the exemplary embodiment. In this embodiment a file system is implemented as a hierarchical structure consisting of files, directories and links. Implementation of the file system requires specific types of objects. The file system has three types of objects: a file, a list of objects (i.e., directory), a reference (i.e., link). All types of objects have two fields: an object Name and Content (see FIG. 2). The object Name is an index field of a string format. The Content is a non-index field, which depends on the type of object. Thus, if the object type is file, the Content is a text field. If the object type is directory, the Content is a list of child-objects. If the object type is a reference, the Content is a link (or a pointer) to another database object (except for the root object).

In the exemplary architecture depicted in FIG. 2 the root object 210 has a field File System 211. The root object 210 has the child-objects 220, 230, 240 and 250. The objects 220, 260 and 280 correspond to the directories of the file system and always contain the lists of other child-objects. The objects 230, 240, 270 and 285 in this example are files and cannot have any child objects. The exemplary objects 250 and 290 correspond to links of the file system. The content 4 of the object 250 references the object 270 and the content 9 of the object 290 references the object 240. The hierarchy of files and directories begins with the root object 210 representing the file system.

In this embodiment, each file system object is uniquely identified by the type of object, index fields and the object's parent-object. A full path to the object is created as a list of objects of different level within the hierarchy from the root object to the destination object. For example, a path to the file 285 can be represented as:

\Root\Folder, Name1\Folder, Name5\File, Name8\. In one embodiment, a part of the database used by an emulator is loaded into memory. In this case, only the fields that are filled are loaded. Note that if the object types are edited at a time of loading the database into the memory, the database needs to be re-loaded in order for modifications to take place. In yet another embodiment, a system registry can be emulated using the architecture depicted in FIG. 2.

FIG. 3 illustrates an example of implementing the emulator using an object-oriented non-relational database, in accordance with the exemplary embodiment. In this example, the database is partially loaded into memory. In order to support the functionality of an emulator, it is not necessary to load the entire database 310 into the memory. It is sufficient to only specify the path to the selected objects that need to be loaded for the emulator. A part of the database from the root object to the selected objects is recreated in the memory using the paths to the selected objects that include all objects within the hierarchy that lie between the root object and the selected object.

If the objects specified in the path are not found in the database, they are automatically created as the path is being executed. For a given branch of the object-oriented non-relational hierarchical database depicted in FIG. 1, a block 320 (in FIG. 3) of an operational memory is allocated. It is used for a pre-distributed database portion. Then, for the memory block 320 a backup copy 330 is created. The backup copy includes all of the cross-references. Thus, the selected part of the database is loaded into the allocated memory area 320 to be employed by the emulator (i.e., to be modified by the emulated malware component).

Then, during operation of the emulator, all of the database changes take place in the allocated memory 320 (i.e., in the emulated database). In some cases, the allocated memory 320 may not be sufficient, and an additional memory block 340 can be used. After the emulated database is modified by the emulator, and emulation results are recorded, the database needs to be restored to the initial state. In order to restore the database to it its initial state (i.e., the state prior to emulation), the backup copy 330 is copied into the memory block 320 and the additional memory area 340 is cleared (e.g., flashed). Note that the integrity of the cross-references (i.e., links) remains it tact.

FIG. 4 illustrates a block diagram of a method for using the object-oriented hierarchical database (depicted in FIG. 1) in the emulator, in accordance with the exemplary embodiment. At step 410 a selected portion of the database (i.e., branch) is loaded into an allocated memory block. A backup copy of the loaded database branch is created at step 420. The backup copy can be placed into an operating memory or on a hard disk.

Note that loading backup copy into the operating memory can speed up the operation of the emulator significantly. Then, at step 430, the database portion loaded at step 410 is employed by the emulator. At step 440 it is determined whether the allocated memory block is sufficient for operations of the emulator. If the memory block is not sufficient, then, at step 450, additional memory is provided. After the emulation is completed, the database is restored to its initial state at step 460.

Figure 5A:
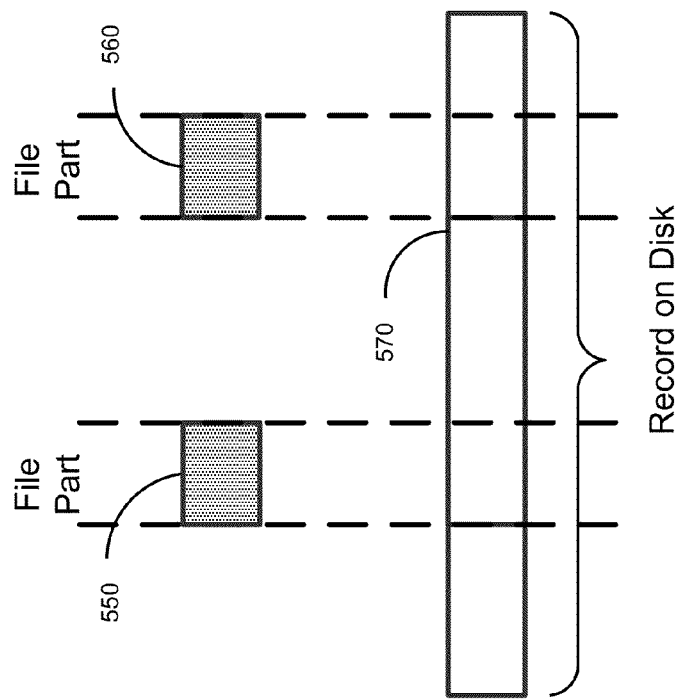
FIGS. 5A and 5B illustrate examples of transparent data read/write operations, in accordance with the exemplary embodiment.
Figure 5B:
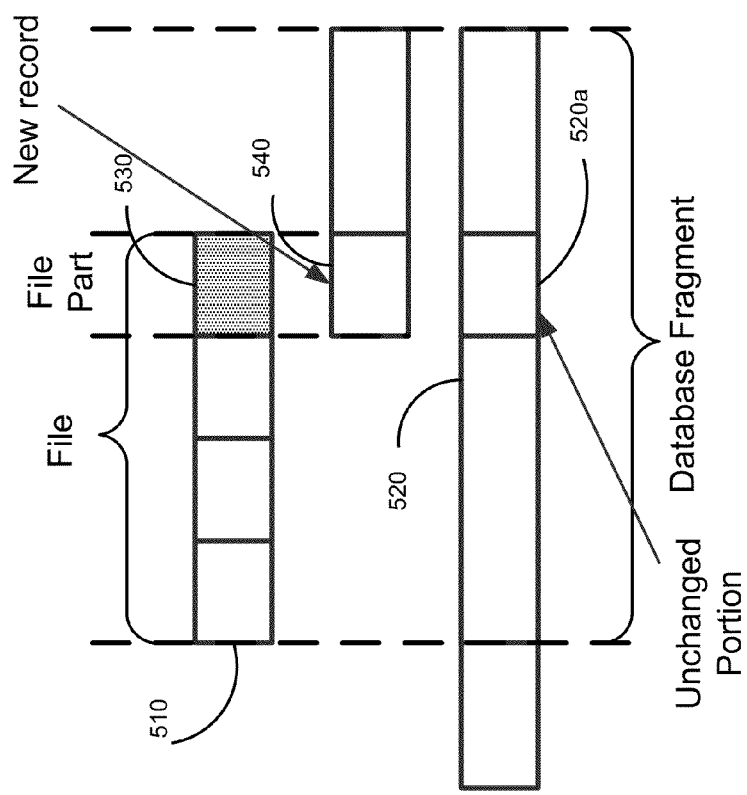

FIGS. 5A and 5B illustrate examples of data read/write operations, in accordance with the exemplary embodiment. FIG. 5A illustrates "transparent" read and write operations. During read operation, file 510 is read from the part 520 of the database located on disk. However, if prior to reading, some write operations that modified part 530 of the file 520 are performed, the mechanism of "transparent" write operations is used. For this, a new record 540 is created, while the corresponding portion 520a of the initial file remains unchanged. Then, when file 510 is read, the part 530 is read from the record 540 instead of being read from the part 520. Thus, the operations with the file system can be emulated without affecting any real files located on the disk.

FIG. 5B illustrates read operation when a file is read from different parts of the disk. An exemplary file consists of parts 550 and 560 that are located on the record 570 on the disk. The parts 550 and 560 are located on the record 570 and are out of order. However, for reading the file is used as a single entity. Thus, the method of "transparent" read and write from and to the disk can be implemented.

Figure 6:
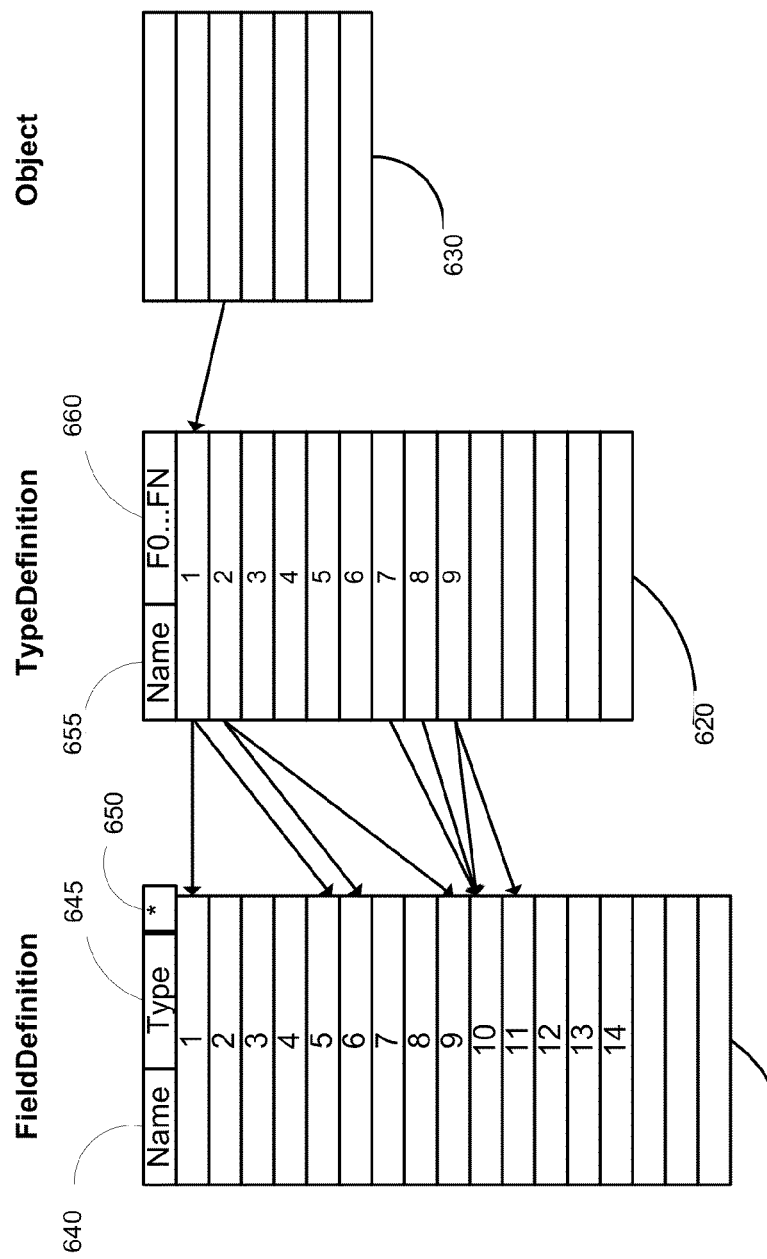
FIG. 6 illustrates an example of table association within the object-oriented database, in accordance with the exemplary embodiment.

FIG. 6 illustrates an example of table association within the object-oriented database, in accordance with the exemplary embodiment. The hierarchical structure of the database depicted in FIG. 1 is presented in form of association tables. FIG. 6 illustrates an exemplary database consisting of association tables: a table of objects 630, a table of type definitions 620 and a table of field definitions 610.

The field table 610 contains description of all fields present in objects of the hierarchical database depicted in FIG. 1. The fields are sorted out in the same order as in the types. A field description in the table uses the following parameters: field name 640, field type 645, index field flag 650. The filed name does not have to be unique. In order to associate the tables, the position of the filed in the table is used. The field type 645 can be a string, a number, a link or a list.

If a new field is added to a given type while the database is in use, the new field becomes available only when the database is reloaded. It will be placed in the table near the fields of the same type. The type table 620 contains the descriptions of all types present in the hierarchical database depicted in FIG.

1. Each type has a reference to a set of fields (i.e., field range) in the field table 610. A type description in the type table 620 uses the following parameters: type name 655, field range 660.

Some types can reference to the same filed range or just an upper part of this range. The fields are sorted out in such a way that the index fields are positioned first, non-index fields are placed after them, then, go lists and references (i.e., links). Thus, a type, created based on another type, cannot reference to a part of the filed range, which does not contain any index fields. In the example depicted in FIG. 6, the fields 10-14 in the table 610 coincide for types 7 and 8 of the table 620. In this case the type 8 is considered to be inherited from type 7 of the table 620. In this example, the fields 10-11 of the table 610 are coincident in part for types 7 and 9 of the table 620.

However, in the latter case, the type 9 of the table 620 cannot have a field range 9-11 of the table 610, since the index fields are always located in the beginning of the field range. The exemplary database consisting of the associated tables allows speeding up read and search operations in the hierarchical database. An access to the objects of different type becomes more flexible and yet less complicated. For example, the hierarchical tree of the proposed non-relational database consisting of approximately 500 objects can be scanned in an order of a second.

Thus, the exemplary embodiment provides an easily implemented non-relational database that can support the emulation of a large file system. During the emulation, the file system stored in the database is affected by a malware and is modified. The proposed embodiment provides for a robust and efficient way of recovering a malware-affected database fragments so it they can be used for testing and analyzing the file system with another malware component.

Those skilled in the art will also appreciate that the preferred embodiment provides for an effective functionality of an emulator and allows adding new objects and new types of objects without affecting the integrity of the non-relational database.

Figure 7:
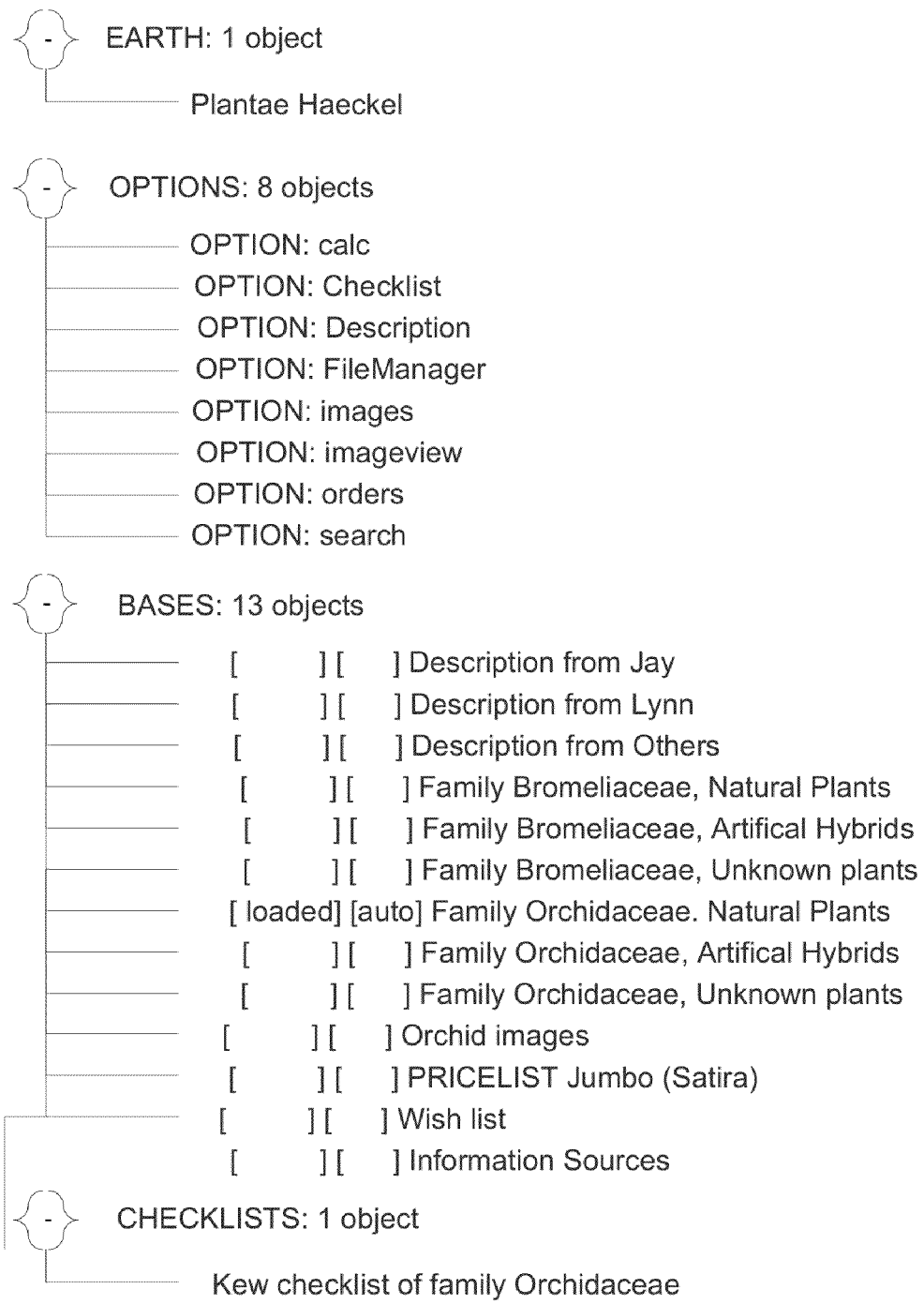
FIG. 7 illustrates an exemplary structure of a database root object.

FIG. 7 illustrates an exemplary structure of a database root object. An exemplary non-relational database generates a screen shot depicted in FIG. 7. The root object has 13 unique data fields, such as, for example "Description from Jay," "PRICELIST Jumbo (S atira)," "Information sources," etc.

FIG. 8 illustrates an exemplary structure of a list of all types of object fields. There is a total of 45 types of object fields, such as, for example, void (i.e., empty), text (string, tstring, lstring), signed variable, unsigned variable, Boolean expression, etc.

FIG. 9 illustrates an exemplary structure of user types of the data object. An exemplary database has 51 user types. For example, Root is a type of database root object; Synonym—is a type of an object that is a synonym to other objects that reference this object; Kingdom is a type of plant habitat, Specie is a type of plant, SubSpecie is a subtype of plant, and etc.

Figure 10:
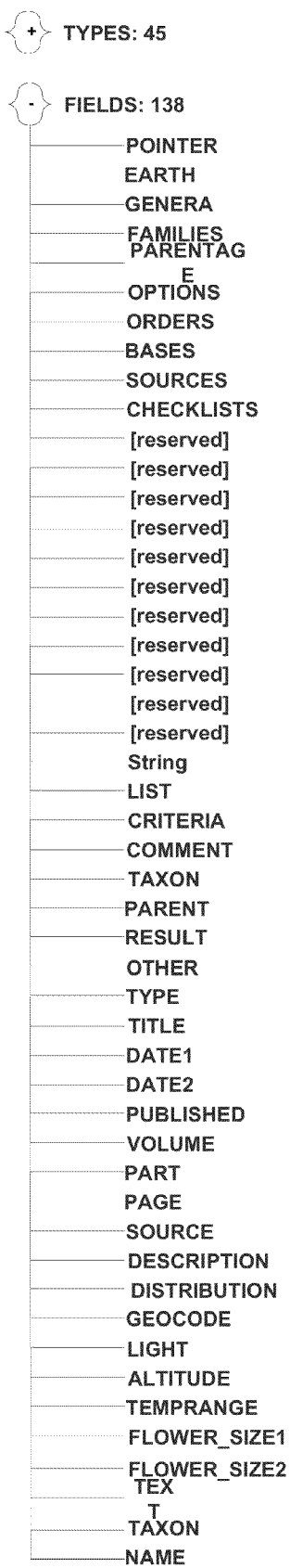
FIG. 10 illustrates an exemplary structure of a list of user fields of the data object.

FIG. 10 illustrates an exemplary structure of a list of user fields of the data object. An exemplary database has 138 user fields having also fields reserved for a future use.

Figure 11:
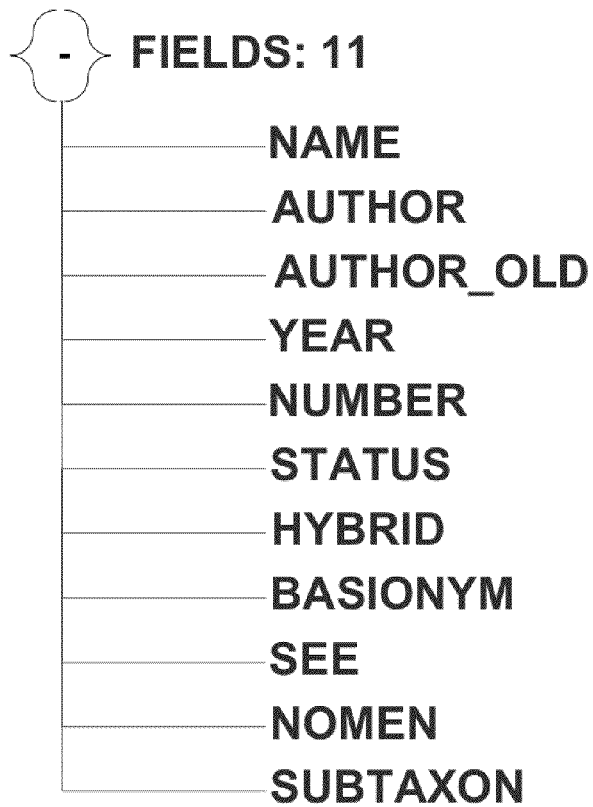
FIG. 11 illustrates an exemplary structure of a structure of an exemplary type.

FIG. 11 illustrates an exemplary structure of a structure of an exemplary type Taxon (i.e., a prototype of all other types). Taxon has parameters such as ID, Base structure, Group number, Size, Flags (insertable and changed), Object count, and a field set (Name, Author, Author_old, Year, Number, Status, Hybrid, Basionym, See, Nomen, Subtaxon).

FIG. 12 illustrates an exemplary structure of an exemplary object type Taxon. The field Subtaxon consists of 82 elements. There are two index fields (Name and Author) that are filled and two non-index fields (Status and Nomen).

FIG. 13 illustrates an exemplary structure of an object Taxon with five object's index fields (Name, Author, Author_old, Year, Number) and four non-index fields (Status, Hybrid, Basionym, See, Nomen) and sixteen child-objects.

Figure 14:
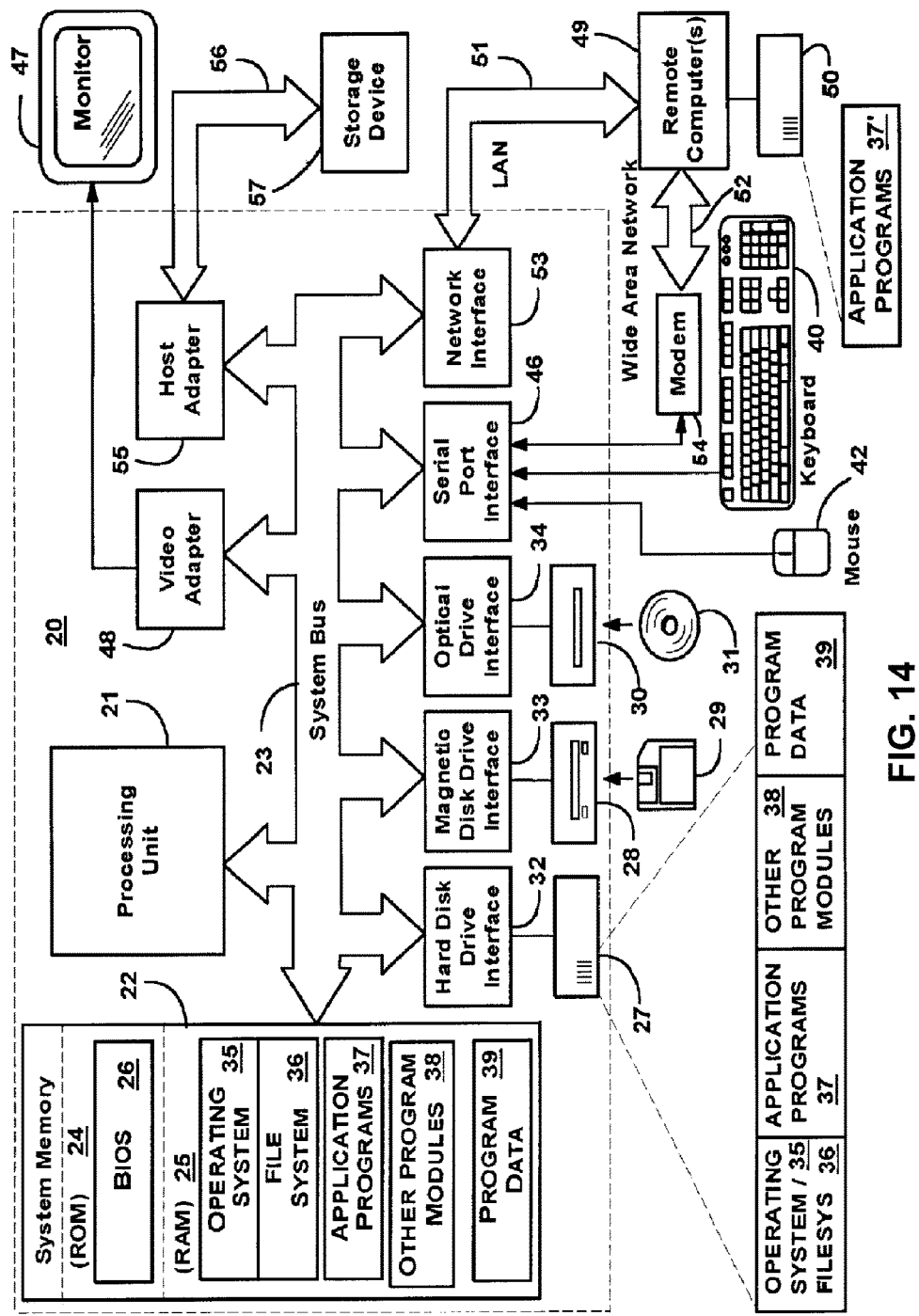
FIG. 14 illustrates a schematic of an exemplary computer system on which the exemplary embodiment can be implemented.

With reference to FIG. 14, an exemplary system for implementing the invention includes a general purpose computing device in the form of a computer or server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the personal computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the personal computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46.

In a networked environment, program modules depicted relative to the personal computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for a non-relational database for supporting functionality of a emulator.

It should also be appreciated that various modifications, adaptations and alternative embodiments thereof may be made within the scope and spirit of the present invention. The invention is further defined by the following claims.

What is claimed is:

1. An object oriented non-relational database system for storing a file system used by a malware emulator, the system comprising:
   a processor;
   a memory coupled to the processor;
   computer code loaded into the memory for implementing the following functionality:
   an object hierarchy represented by relationships among the data objects of the object-oriented non-relational database;
   a root object placed on top of the hierarchy, the root object being a parent-object to all database objects within the hierarchy;
   a plurality of database objects, wherein:
   each database object has a type assigned to it and which is defined by a selected set of data fields;
   each database object has at least one data field;
   each database object has a unique parent-object; and
   each database object has a unique set of index fields,
   wherein each database object is defined by a combination of object's parent-object, object's type and object's unique set of the index fields, which are used to access the object;
   wherein objects can only be accessed using the index fields, and
   wherein at least some of the data fields are references that refer to other objects within the database regardless of their location;
   wherein logical separation of the user types is provided by the hierarchy;
   wherein the root object represents the file system and other objects represent files and directories of the file system, and system registry;
   wherein fields of the root object have names that are unique and can only be assigned to the root object;
   wherein a complete path to any destination object within the hierarchy is a list of objects that need to be passed on the way from the root object to the destination object;
   wherein, for any object specified in the path is not found in the database, that object is automatically created as the path is being executed; and
   wherein removal of an object includes first removing all references to the object, then removing child-objects together with their respective references to other objects and only then removing the object itself.

2. The database of claim 1, wherein the root object has unique data fields within the hierarchy.

3. The database of claim 1, wherein a single index field can be the same for several database objects.

4. The database of claim 1, wherein the objects are cross-referenced to each other.

5. The database of claim 4, wherein the objects are cross-references by a link located in data field.

6. The database of claim 1, wherein the data fields are any of:
   a text string;
   a Boolean expression;
   a number;
   a reference; and
   a list.

7. The database of claim 1, wherein the objects on a first level of the hierarchy below the root object have the root object as a parent-object.

8. The database of claim 1, wherein an object table is associated with a type definition table and with a field definition table.

9. The database of claim 8, wherein the tables are associated by their reference fields.

10. The database of claim 9, wherein the reference fields can contain links to any object within the hierarchy except for the root object.

11. The database of claim 1, wherein the database is accessible by a malware component implemented in the emulator.

12. The database of claim 11, wherein the objects can be modified by the emulated malware component.

13. A method for using an object-oriented hierarchical non-relational database in a malware emulator, the method comprising:
   forming an object hierarchy represented by relationships among the data objects of the object-oriented database, the object hierarchy being a proxy for a file system and system registry, each database object having a type assigned to it and which is defined by a selected set of data fields;
   selecting a branch of the database to be used in the malware emulator;
   allocating a memory block for the selected database branch;
   loading the selected database branch into the allocated memory block;
   creating a backup copy of the loaded database branch;
   accessing objects in the loaded data base branch by the malware emulator, wherein the database branch is modified by a malware component and wherein each database object is defined by a combination of object's parent-object, object's type and object's unique set of the index fields, which are used to access the object;
   determining if the allocated memory block is sufficient for malware emulation, wherein if the allocated memory block is insufficient, providing additional memory to the emulator;

recording results of malware emulation upon its completion; and restoring the modified database branch to its initial state by overwriting it with the backup copy in the allocated memory block;

wherein objects can only be accessed using the index fields;

wherein at least some of the data fields are references that refer to other objects within the database regardless of their location;

wherein logical separation of the user types is provided by the hierarchy;

wherein a complete path to any destination object within the hierarchy is a list of objects that need to be passed on the way from the root object to the destination object;

wherein, for any object specified in the path is not found in the database, that object is automatically created as the path is being executed; and wherein removal of an object includes first removing all references to the object, then removing child-objects together with their respective references to other objects and only then removing the object itself.

14. The method of claim 13, wherein the backup copy includes all of cross-references.

15. The method of claim 13, wherein the integrity of the cross-references within the selected database branch remains unchanged after being modified by the malware.

16. The method of claim 13, wherein the database branch is loaded using paths to selected objects within the object-oriented hierarchical database.

17. The method of claim 16, wherein the path to the selected object consists of all objects in the hierarchical database located between a root object and the selected object.

* * * * *